(12) United States Patent
Johnson et al.

(10) Patent No.: US 10,002,387 B2
(45) Date of Patent: Jun. 19, 2018

(54) PRE-CONTRACTED, STAGED, CURRENCY EXCHANGE SYSTEM

(71) Applicant: BANK OF AMERICA CORPORATION, Charlotte, NC (US)

(72) Inventors: Tyler Johnson, Tega Cay, SC (US); Christian Michael Mande, Charlotte, NC (US); James Robert Grimsley, Dover, FL (US); Sara Gill, New York, NY (US); Nathan Dent, Concord, NC (US); Kristy M. Crist, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 596 days.

(21) Appl. No.: 14/512,242

(22) Filed: Oct. 10, 2014

(65) Prior Publication Data
US 2016/0104239 A1    Apr. 14, 2016

(51) Int. Cl.
G06Q 40/00    (2012.01)
G06Q 40/04    (2012.01)

(52) U.S. Cl.
CPC .................................. G06Q 40/04 (2013.01)

(58) Field of Classification Search
None
See application file for complete search history.

(56) References Cited

U.S. PATENT DOCUMENTS

| | | | |
|---|---|---|---|
| 7,177,838 B1 | 2/2007 | Ling | |
| 7,328,189 B2 | 2/2008 | Ling | |
| 7,606,560 B2 | 10/2009 | Labrou et al. | |
| 7,784,684 B2 | 8/2010 | Labrou et al. | |
| 7,848,980 B2 | 12/2010 | Carlson | |
| 7,992,779 B2 | 8/2011 | Phillips et al. | |
| 8,380,177 B2 | 2/2013 | Laracey | |

(Continued)

FOREIGN PATENT DOCUMENTS

WO    2005081917 A2    9/2005

OTHER PUBLICATIONS

Office Action for Canadian Application No. 2,692,978 dated Apr. 21, 2016.

(Continued)

*Primary Examiner* — Jason Borlinghaus
(74) *Attorney, Agent, or Firm* — Michael A. Springs; Moore & Van Allen PLLC; Anup Shrinivasan (57) ABSTRACT

The present invention is directed to apparatuses, methods, and computer program products for implementing a pre-contracted, staged, currency exchange system. Implementation includes receiving travel information from a user; processing the travel information, wherein processing the travel information comprises determining a negotiated currency exchange rate based on the received travel information; generating a contract based on processing the travel information, wherein the contract comprises terms for executing one or more transactions using the negotiated currency exchange rate, wherein the negotiated currency exchange rate is valid for at least one of a predetermined location, a predetermined number of transactions, or a predetermined period of time; and executing one or more transactions using the negotiated currency exchange rate in accordance with the contract terms.

20 Claims, 3 Drawing Sheets

(56) References Cited

U.S. PATENT DOCUMENTS

| | | |
|---|---|---|
| 8,584,251 B2 | 11/2013 | McGuire et al. |
| 2003/0024979 A1* | 2/2003 | Hansen ............... G06O 20/00 235/379 |
| 2004/0215560 A1 | 10/2004 | Amalraj et al. |
| 2006/0060646 A1* | 3/2006 | Lee ............... G06Q 20/04 235/379 |
| 2007/0155418 A1* | 7/2007 | Shau ............... H04M 1/66 455/550.1 |
| 2009/0138255 A1* | 5/2009 | Sterling ............... G06Q 20/10 704/2 |
| 2009/0164327 A1 | 6/2009 | Bishop et al. |
| 2010/0057607 A1* | 3/2010 | Galit ............... G06Q 20/04 705/37 |
| 2010/0241571 A1 | 9/2010 | McDonald |
| 2012/0203700 A1 | 8/2012 | Ornce et al. |
| 2013/0110658 A1 | 5/2013 | Lyman et al. |
| 2013/0159178 A1 | 6/2013 | Colon et al. |
| 2013/0246258 A1 | 9/2013 | Dessert |
| 2013/0254115 A1 | 9/2013 | Pasa et al. |
| 2013/0262315 A1 | 10/2013 | Hruska |

OTHER PUBLICATIONS

Office Action dated Jul. 5, 2016 for Canadian Application No. 2,692,707; 3 pages.

* cited by examiner

PRE-CONTRACTED, STAGED, CURRENCY EXCHANGE SYSTEM

BACKGROUND

When traveling internationally, a traveler is typically required to obtain currency native to a destination location. For example, when traveling from Japan to the United States, a traveler will purchase or withdraw United States currency (e.g., USD) upon arrival in the United States. However, exchange rates for foreign currencies are highly variable and premiums associated with obtaining domestic currencies can fluctuate. Therefore, there is a need to secure a predetermined exchange rate for foreign currencies over a period of time.

BRIEF SUMMARY

The present invention is directed to apparatuses, methods, and computer program products for implementing a pre-contracted, staged currency exchange system. A user is enabled to define negotiated currency exchange rates and transaction premiums for an upcoming trip. Therefore, the user can avoid highly variable currency exchange rates and transaction premiums for the duration of the trip. Furthermore, the user is enabled to pre-stage transactions or withdrawals of funds at the negotiated currency exchange rates and transaction premiums.

In some embodiments, an apparatus for implementing a pre-contracted, staged, currency exchange system is provided. The apparatus comprises: a memory; a processor; and a module stored in memory, executable by a processor. The module is configured to receive travel information from a user. The module is further configured to process the travel information, wherein processing the travel information comprises determining a negotiated currency exchange rate based on the received travel information. The module is further configured to generate a contract based on processing the travel information, wherein the contract comprises terms for executing one or more transactions using the negotiated currency exchange rate, wherein the negotiated currency exchange rate is valid for at least one of a predetermined location, a predetermined number of transactions, or a predetermined period of time. The module is further configured to execute one or more transactions using the negotiated currency exchange rate in accordance with the contract terms.

In some embodiments, the travel information comprises at least one of a passenger name, an address, a phone number, a driver's license number, a birth certificate, a passport, an email address, an age, a date of birth, a flight number, a train number, a ship number, a reservation confirmation number, an arrival time, a departure time, a location, a zip code, a city, a country, global positioning system (GPS) coordinates, longitude and latitude, an IP address, a hotel name, a hotel address, an account number, a routing number, an account balance, a transaction history, a card number, a card expiration date, or account limits.

In some embodiments, the user is a traveler on at least one of a vacation, a business trip, a school trip, a commute, an excursion, a safari, a tour, or a cruise.

In some embodiments, the user is enabled to input the travel information via an interface, wherein the user is enabled to allocate a predetermined amount of funds for executing one or more transactions.

In some embodiments, processing the travel information further comprises determining a location associated with at least one of the user or a device associated with the user, wherein the device associated with the user is at least one of a smart phone, a tablet, a wearable device, a mobile phone, a laptop, or a computing device.

In some embodiments, processing the travel information further comprises determining a country and a language native to the user, wherein the apparatus is configured to display information to the user in the language native to the user via a display.

In some embodiments, processing the travel information further comprises determining a negotiated transaction premium associated with executing the one or more transactions.

In some embodiments, the user is enabled to pre-stage execution of the one or more transactions.

In some embodiments, the user is enabled to configure one or more limits associated with executing the one or more transactions.

In some embodiments, the allocated amount of funds remains in an existing account associated with the user, wherein the user is issued at least one of a temporary card, a personal identification number (PIN), a password, or a token associated with a mobile wallet for accessing the allocated amount of funds during execution of the one or more transactions.

In some embodiments, the allocated amount of funds is placed into a temporary account, wherein the user is issued at least one of a temporary card, a personal identification number (PIN), a password, or a token associated with a mobile wallet for accessing the allocated amount of funds during execution of the one or more transactions.

In some embodiments, the module is configured to present to the user at least one message, wherein the at least one message includes an offer to redetermine the determined negotiated currency exchange rate.

In some embodiments, a method for implementing a pre-contracted, staged, currency exchange system is provided. The method comprises: receiving, using a computing device processor, travel information from a user. The method further comprises: processing, using a computing device processor, the travel information, wherein processing the travel information comprises determining a negotiated currency exchange rate based on the received travel information. The method further comprises: generating, using a computing device processor, a contract based on processing the travel information, wherein the contract comprises terms for executing one or more transactions using the negotiated currency exchange rate, wherein the negotiated currency exchange rate is valid for at least one of a predetermined location, a predetermined number of transactions, or a predetermined period of time. The method further comprises: executing, using a computing device processor, one or more transactions using the negotiated currency exchange rate in accordance with the contract terms.

In some embodiments, the user is enabled to input the travel information via an interface, wherein the user is enabled to allocate a predetermined amount of funds for executing one or more transactions.

In some embodiments, the allocated amount of funds remains in an existing account associated with the user, wherein the user is issued at least one of a temporary card, a personal identification number (PIN), a password, or a token associated with a mobile wallet for accessing the allocated amount of funds during execution of the one or more transactions.

In some embodiments, the allocated amount of funds is placed into a temporary account, wherein the user is issued at least one of a temporary card, a personal identification number (PIN), a password, or a token associated with a mobile wallet for accessing the allocated amount of funds during execution of the one or more transactions.

In some embodiments, a computer program product for implementing a pre-contracted, staged, currency exchange system is provided. The computer program product comprises a non-transitory computer-readable medium comprising code causing an apparatus to receive travel information from a user. The code further causes the apparatus to process the travel information, wherein processing the travel information comprises determining a negotiated currency exchange rate based on the received travel information. The code further causes the apparatus to generate a contract based on processing the travel information, wherein the contract comprises terms for executing one or more transactions using the negotiated currency exchange rate, wherein the negotiated currency exchange rate is valid for at least one of a predetermined location, a predetermined number of transactions, or a predetermined period of time. The code further causes the apparatus to execute one or more transactions using the negotiated currency exchange rate in accordance with the contract terms.

In some embodiments, the user is enabled to input the travel information via an interface, wherein the user is enabled to allocate a predetermined amount of funds for executing one or more transactions.

In some embodiments, the allocated amount of funds remains in an existing account associated with the user, wherein the user is issued at least one of a temporary card, a personal identification number (PIN), a password, or a token associated with a mobile wallet for accessing the allocated amount of funds during execution of the one or more transactions.

In some embodiments, the allocated amount of funds is placed into a temporary account, wherein the user is issued at least one of a temporary card, a personal identification number (PIN), a password, or a token associated with a mobile wallet for accessing the allocated amount of funds during execution of the one or more transactions.

The present invention provides many benefits to the user. The user avoids highly variable currency exchange rates and transaction premiums. Instead, the user knows exactly how much it will cost to exchange currencies and withdraw funds. With costs known, the user can better budget expenses for the trip. The present invention further provides security in a sense that the user can stage multiple withdrawals of smaller amounts of funds during the trip as opposed to being required to carry a large amount of funds received at one withdrawal.

BRIEF DESCRIPTION OF THE DRAWINGS

Having thus described embodiments of the invention in general terms, reference will now be made to the accompanying drawings, where:

DETAILED DESCRIPTION OF THE PRESENT INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In other embodiments, an "entity" may not be a financial institution.

In some embodiments, a user (e.g., a traveler, a visitor, a commuter, or the like) may hold one or more financial accounts (e.g., a savings account, a checking account, a travel account, a temporary account, an investment account, or the like) associated with the entity from which the user may withdraw or deposit funds. The user is enabled to deposit funds into the account, withdraw funds from the account, transfer funds between accounts, inquire about a balance associated with the account, or execute another transaction using the account. The one or more financial accounts may serve as a relationship between the user and the entity. In other embodiments, the user holds one or more accounts with another financial institution.

The present invention is directed to apparatuses, methods, and computer program products for implementation of a pre-contracted, staged, currency exchange system. The system enables the user to enter into a contract with the entity that defines a mutual agreement to a predetermined rate for exchanging foreign currencies. The system essentially provides a modern electronic alternative to a traveler's check.

Before an upcoming trip (e.g., a vacation, a business trip, a commute, or the like), the user may wish to withdraw an amount of funds (or execute another transaction) from a held account, or exchange an amount of funds of one country's currency to another country's currency for use during the trip. Typically, a premium is required to be paid by the user to withdraw the amount of funds in a foreign country and exchange a foreign currency (e.g., a currency of a country native to the user) for a domestic currency (e.g., a currency readily accepted at a travel destination location). The premium for withdrawing funds and exchanging currencies is highly variable as foreign currency exchange rate values fluctuate in global markets. So, the user may, by the system of the present invention, establish a static (e.g., non-changing) transaction premium and foreign currency exchange rate for withdrawing funds and converting currencies over a period of time (e.g., for the duration of a trip). Therefore, through utilization of the system of the present invention, the user may avoid potentially large and/or fluctuations in premiums associated with withdrawing funds and exchanging currencies (or executing other transactions).

Furthermore, the system of the present invention provides means for the user to stage (e.g., schedule) a predetermined number of withdrawals (or other transactions) for the duration of the trip. For example, the user can make withdrawals of smaller amounts of funds as opposed to withdrawing one large amount of funds, thereby avoiding a large currency exchange or transaction premium. Additionally, the system of the present invention addresses concerns associated with potential security concerns associated with carrying a large amount of funds while traveling in a foreign destination location. The system also enables the user to negotiate a predetermined currency exchange rate for one or more withdrawals (or all withdrawals or other transactions) in a staged series of multiple withdrawals at various times or locations during the trip. Staging the series of multiple withdrawals with a predetermined foreign currency exchange rate guarantees the user a static currency exchange rate across one or more withdrawals and eliminates concern in regards to fluctuations of the foreign currency exchange rates in the global markets. Therefore, the system of the present invention provides the user with an ability to better budget expenses to be incurred during the trip.

The system is configured by inputting information associated with an expected or predetermined travel plan, an itinerary, airline tickets, or the like via an interface. Information may include passenger information (e.g., a name, an address, a phone number, a driver's license number, a birth certificate, a passport, an email address, an age, a date of birth, or other information associated with the user), travel information (a flight number, a train number, a reservation confirmation number, an arrival time, a departure time, a location (e.g., a zip code, a city, a country, global positioning system (GPS) coordinates, longitude and latitude, an address, an IP address, or the like), a hotel (or another accommodation means) name or address, or the like), account information (e.g., an account number, a routing number, an account balance, a transaction history, a card number, a card expiration date, account limits, or the like) associated with the one or more accounts, user preferences, or other information related to the travel plan.

Typically, the user inputs information via the interface. In some embodiments, a second user (e.g., a teller, an agent, an associate, an administrator, a customer service representative, an account manager, or the like) associated with the entity is enabled to input, delete, or edit information via the interface. In other embodiments, a third party (e.g., a travel agent, a trip advisor, a concierge, or the like) inputs, deletes, or edits information via the interface. Inputting information may include registration of the user with the system.

In some embodiments, the interface used to input information is associated with an automated teller machine (ATM). In other embodiments, the interface is associated with a mobile device (e.g., a smart phone, a tablet, a wearable device, or the like) or other computing device (e.g., a laptop, a desktop computer, or the like). The device associated with the interface may be associated with or operated by the user, the entity (or the second user), or the third party.

The user is enabled via the interface to allocate a predetermined amount of funds for use during the trip. In some embodiments, the allocated amount of funds available for use during the trip is held in an existing account held by the user and associated with the entity. In other embodiments, the allocated amount of funds is transferred from an existing account held by the user and associated with the entity and transferred into a second account (e.g., a temporary travel account) for use during the upcoming trip. In alternative embodiments, the allocated amount of funds is transferred from an existing account held by the user and associated with another financial institution and transferred into a second account (e.g., a temporary travel account) associated with the entity for use during the upcoming trip. Additionally, the allocated amount of funds may be held in an existing account held by the user and associated with another financial institution. The allocated amount of funds may be transferred into another account dedicated to servicing expenses incurred during the upcoming trip, or may remain in an account currently associated and/or accessed by the user. In other embodiments, the user, the second user, or the third party is enabled to create a new account for servicing expenses incurred during the upcoming trip. The second account (e.g., the temporary travel account) may be a new account created specifically for use by the user during the trip or an existing account configured for reuse by multiple temporary users.

Limits (e.g., spending limits, transaction amount limits, transaction location limits, purchase type limits, purchase category limits, time or day limits, or the like) may be placed on one or more accounts associated with the user and therefore enable the user to control spending habits of the allocated amount of funds. For example, the user may not be able to spend more than $50 on entertainment-related purchases while on a business trip, and may not be able to exceed an allotted $500 weekly total budget as defined by the aforementioned predetermined amount of funds. The user, the second user, or the third party is enabled to configure and/or define limits. The user is enabled to use the allocated amount of funds until the allocated amount of funds is exhausted.

Further, the user, when inputting information, may predefine which locations he will be visiting during the trip. He may further specify an allotted amount of funds that he wishes to withdraw, access, or exchange for currency in each location or during a specific period of time. The contract may outline or define negotiated currency exchange rates and transaction premiums for each individual location or time period, or may include one standard rate and premium for all locations and times. Thus, the system enables the user to avoid potentially high or variable currency exchange rates and/or transaction premiums.

For example, the user allocates $5,000 (the allocated amount of funds) to a temporary travel account for use during the trip. Because the trip includes visits to multiple countries, it doesn't make sense for the user to pay premiums associated with exchanging all $5,000 into currency accepted in the first visited country only to pay premiums associated with exchanging the remaining balance of the allocated amount of funds into a currency accepted in the second country. Instead, the user predetermines locations and smaller amounts of withdrawals at negotiated currency exchange rates and transaction premiums so that the user can eliminate having to pay hefty premiums associated with exchanging and transacting large amounts of the allocated amount of funds.

The inputted information is received, from at least one of a mobile device associated with the user, a computing device associated with a financial institution, an ATM, or another computing device, by the system and stored in a memory location. After receiving and storing the inputted information, the system is configured to process the inputted information. Processing the inputted information occurs substantially simultaneously to receiving the inputted information (e.g., in real time) or at a predetermined amount of time after receiving the inputted information. The system may be configured to receive a least amount of data required to establish relationships between the user, the entity, and any third party.

Processing the inputted information includes determining a negotiated exchange rate for converting currencies. The negotiated currency exchange rate is determined based on the inputted information, the allocated amount of funds, market information, or other information. For example, if the allocated amount of funds to be used or accessed during the trip is a substantially small amount (e.g., $100), the negotiated currency exchange rate may include a higher premium required to be paid by the user. Conversely, if the allocated amount of funds to be used or accessed during the trip is a substantially large amount (e.g., $10,000), the negotiated currency exchange rate may include a lower premium required to be paid by the user. The system may include predefined tiers of pricing associated with the negotiated currency exchange rate based on the allocated amount of funds, the inputted information, a time and/or date associated with receipt of the inputted information, or the like. The negotiated currency exchange rate is typically honored for a predetermined period of time associated with the duration of the trip. So, if the user wishes to exchange currencies multiple times and in different locations during the trip, the user receives the same negotiated currency exchange rate for all currency exchange-related transactions. The system may also determine multiple negotiated currency exchange rates that are each honored on different days, during different times, at different or various locations, for different users, for different scheduled, predetermined, or non-predetermined transactions, or the like.

Processing the inputted information also includes determining a negotiated transaction premium associated with withdrawing funds, exchanging currencies, using an ATM or point-of-sale (POS) device associated with another entity or financial institution, or executing anther transaction. The negotiated transaction premium is determined by the system based on the allocated amount of funds, the inputted information, market information, or other information. In some embodiments, the negotiated transaction premium is a one-time payment amount that is required to be paid upfront (e.g., before the trip). The one-time negotiated transaction premium enables the user the pay the negotiated transaction premium once and then have unlimited access to the allocated amount of funds via withdrawals or executing currency exchanges or other transactions. In other embodiments, the negotiated transaction premium is a predetermined payment amount that is required to be paid for each executed transaction. For example, the user is required to pay a set payment amount each time he withdraws funds or exchanges currencies. In alternative embodiments, the negotiated transaction premium is a predetermined percentage of the transaction amount. For example, the entity may require the user to pay five percent of the overall withdrawal amount as the negotiated transaction premium. The negotiated transaction premium may also be variable based on the allocated amount of funds, the inputted information, a time of day, a location, or other information. The negotiated transaction premium is typically honored for a predetermined period of time associated with the duration of the trip. The system may also determine multiple negotiated transaction premiums that are each honored on different days, during different times, at different or various locations, for different users, for different transactions, or the like.

Processing the inputted information further includes generating a contract between the user and the entity. The contract includes at least the negotiated currency exchange rate and the negotiated transaction premium. The contract is typically an agreement to the negotiated currency exchange rate and/or negotiated transaction premium between the user and the entity, but may also include an agreement between the second user, the third party, or another financial institution. In some embodiments, the contract is an electronically generated and system-produced document. In other embodiments, the contract is a physical paper document written or typed by the user, the second user, the third party, or another person. The contract defines the agreed-upon currency exchange rate and/or transaction premium for a period of time, a number of transactions, a transaction amount limit, each transaction, or the like.

Processing the inputted information further includes determining a native country associated with the user so that the system is configured to display information to the user in a language native to the determined country via the interface. For example, if the user is a Japanese traveler and travels to the United States, where most (if not all) ATMS are configured to display information in English, and the user interacts with an ATM associated with the system, the system, upon receiving an input from the user (e.g., a card swipe, a presentation of readable indicia, a manual input or selection, or the like) determines that the user is Japanese and therefore displays information in Japanese. The country associated with the user is determined by the system based on the allocated amount of funds, the inputted information, received user inputs, or other information.

In some embodiments, a second contract is negotiated between the entity and a third party financial institution with which the user holds an account. The second contract may include a negotiated currency exchange rate or a negotiated transaction premium for a transaction (e.g., a currency exchange, funds withdrawal, purchase, or the like) executed by the user. For example, if the user holds an account with the third party financial institution and executes a transaction using a temporary travel account associated with the entity, the second contract outlines the associated premiums and currency exchange rates agreed-upon between the entity and the third party financial institution. The second contract may further include an agreed-upon method of settlement of account balances affected by user-executed transactions during the trip. For example, in some embodiments, the entity and the third party financial institution agree to settle at a predetermined time before the start of the trip and therefore a premium is required to be paid up front. Alternatively, the entity and the third party financial institution may agree to settle at a predetermined time after the end of the trip (e.g., when the user returns to his or her native country), or after each executed or attempted transaction. The second contract may also include terms that enable the entity or the third party (or the user) to waive specific currency exchange or transaction premiums.

Processing the inputted information further includes determining a location associated with the user. The system is configured to determine a location, based on the allocated amount of funds, the inputted information, received user inputs, or other information. For example, when a Japanese traveler's flight lands in the United States, the system is configured to determine that a mobile device known to be associated with the user is located in the United States. The system is configured to determine that the user (or a device associated with the user) has arrived at a border crossing, is in at international airport, port, train station, or the like.

After processing the inputted information, the system is configured for use—the user is enabled to execute transactions (e.g., withdrawals, currency exchanges, or the like) in accordance with the terms defined by the generated contract. The user may execute transactions via a mobile device, a smart phone, a POS device, an ATM, or the like at any of the predetermined locations, or locations outside a predetermined path of travel. Any unused funds of the allocated amount of funds may be reverted back into the one or more accounts held by the user. A premium for reverting funds (e.g., a currency exchange or transaction premium) may be required to be paid by the user. The system is also configured to prompt the user with an offer to renegotiate the terms of the contract.

If the user holds an existing account associated with the entity, the user may simply be issued a new card or new PIN to access the allocated amount of funds. The newly-issued card or PIN may be temporary (e.g., only valid for the duration of the trip) and, upon use, may serve as an indication to the system that the user wishes to use the allocated amount of funds under the negotiated currency exchange rate or transaction premium for a particular transaction. The allocated amount of funds may be held in a temporary travel account associated with the entity or another financial institution. The allocated amount of funds may also be held in an existing account associated with the entity or another financial institution. If the user holds an existing account associated with another financial institution (and therefore does not hold an existing account with the entity), the allocated amount of funds may be transferred into a temporary account associated with the entity. The user is then issued a temporary card or mobile wallet token so that the user has access to the allocated amount of funds. The user may also be issued a temporary card, token, or another device that enables the user to access the allocated amount of funds in an account associated with another financial institution. The user may also use an existing card to access the allocated amount of funds in an existing account or a newly created temporary account associated with the entity or associated with another financial institution. The negotiated currency exchange rate may serve as an insurance policy with an associated premium to hedge against the volatility associated with fluctuating foreign currency exchange rates during the trip. The entity may contact the other financial institution with which the user holds an existing account and indicates to the other financial institution that any transactions following within the terms of the contract with the user will be executed in accordance with the contract terms. For transactions occurring in accordance with the contract, the other financial institution applies the negotiated currency exchange rate and transaction premium and then either bills or transfers any differences between the negotiated currency exchange rate and the actual currency exchange rate that should have been associated with the transaction at the time of the transaction to the entity.

The system is configured to generate and transmit a message (e.g., an offer, an email, a notification, a text message, an alert, or the like) to the user at various times during operation of the system. For example, when the system determines that a Japanese traveler's flight has landed in the United States, the system generates and transmits to the traveler's smart phone a message that includes information about the location of the nearest currency exchange system kiosk, directions to the nearest ATM, current exchange rates, an offer to exchange currency, an offer to withdraw funds or transfer funds, or the like. The message is accessible via an interface presented by a mobile application, an operating system, or the like associated with a device associated with the user. The message may also present an offer to the user to renegotiate the negotiated currency exchange rate and/or the negotiated transaction premium. The user may be enabled to input additional information, such as inputting an amount of funds, make a selection of which third party provides the best negotiated currency exchange rate or transaction premiums, or execute other actions via the message. In some embodiments, user selection of a third party (or the entity) is received by the system, wherein receiving the user selection initiates registration and enrollment of the user, the entity, and/or the third party into the contract, executes a transaction, or executes another action.

User authentication may be required by the system at various times during operation of the system. The system prompts the user for at least one authentication credential (e.g., a password, a passcode, a personal identification number (PIN), an answer to a security question, a biometric input, readable indicia, a gesture, a user input, or the like). The system receives the at least one authentication credential and compares the received at least one authentication credential to a plurality of authentication credentials associated with user authentication. The system determines at least a partial match between the at least one authentication credential and the plurality of authentication credentials associated with user authentication. Based on determining a match, the system authenticates the user and executes the transaction (or other action requested by the user). If no match is determined between the at least one authentication credential and the plurality of authentication credentials associated with user authentication, the system may prompt the user for another authentication credential or deny the user execution of the transaction or other requested action.

Figure 1:
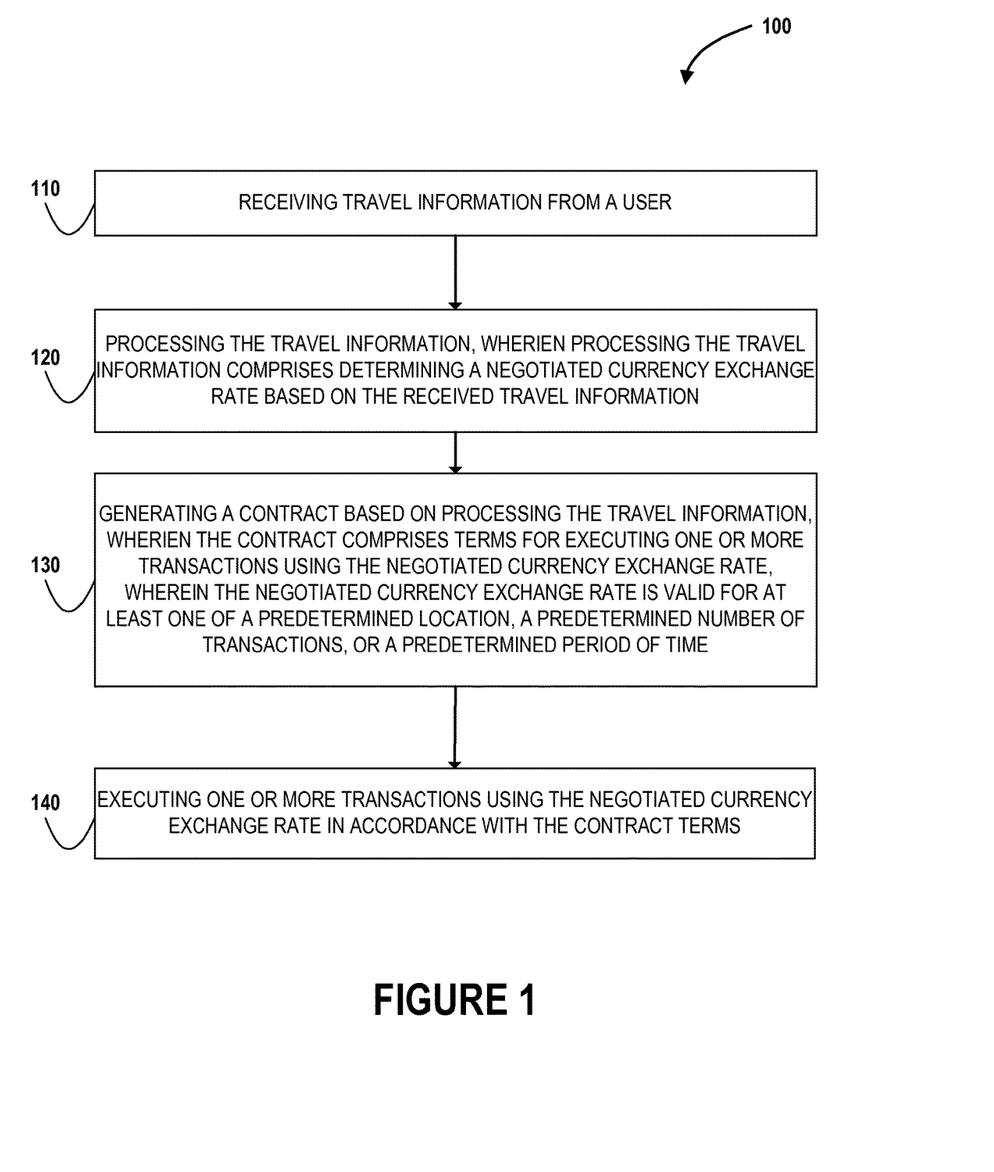
FIG. 1 is an exemplary process flow illustrating a process for implementing a pre-contracted, staged, currency exchange system, in accordance with embodiments of the present invention.

FIG. 1 illustrates an exemplary process flow 100 for implementing a pre-contracted, staged, currency exchange system. At block 110, the process includes receiving travel information from a user. At block 120, the process includes processing the travel information, wherein processing the travel information comprises determining a negotiated currency exchange rate based on the received travel information. At block 130, the process includes generating a contract based on processing the travel information, wherein the contract comprises terms for executing one or more transactions using the negotiated currency exchange rate, wherein the negotiated currency exchange rate is valid for at least one of a predetermined location, a predetermined number of transactions, or a predetermined period of time. At block 140, the process includes executing one or more transactions using the negotiated currency exchange rate in accordance with the contract terms.

Figure 2:
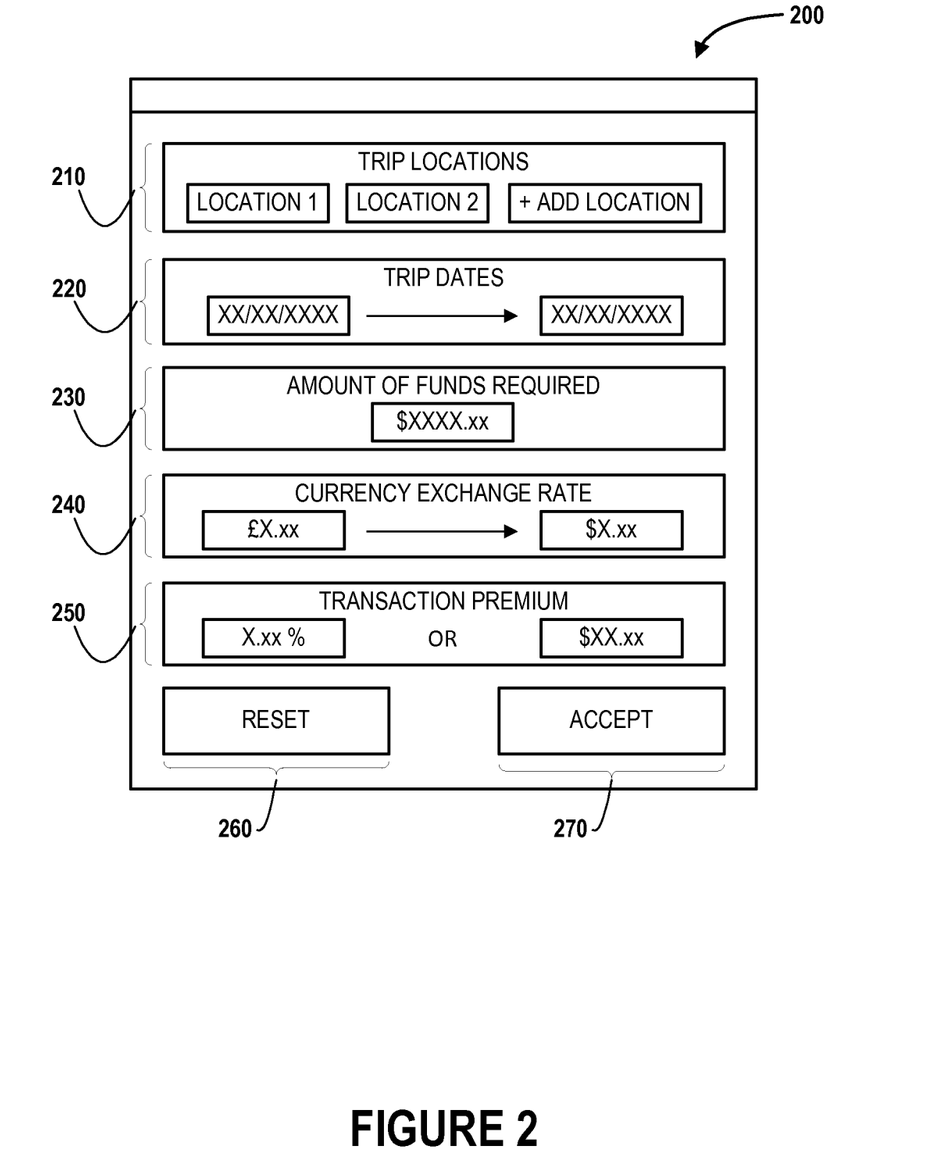
FIG. 2 is an exemplary user interface for inputting information associated with a trip and for calculating a negotiated currency exchange rate and transaction premium, in accordance with embodiments of the present invention.

FIG. 2 illustrates an exemplary user interface 200 for enabling the user to input information associated with the trip. At block 210, the user inputs one or more destination locations of the trip. The user is enabled to select multiple locations from a list, or input a custom location. At block 220, the user is enabled to select or input dates that define a duration of the trip. The user is enabled to select an arrival date and time for each location or for the trip as a whole. At block 230, the user is enabled to input an amount of funds required for each location or for the duration of the trip as whole. The user is enabled to select or input an amount of funds and/or a currency. At block 240, the system calculates a currency exchange rate based on processing at least the above inputted information, market information, or other information. The user is also enabled to select a currency or input a custom currency exchange rate as a counter-offer. At block 250, the system calculates a transaction premium based on processing at least the above inputted information, market information, or other information. The user is also enabled to input a custom transaction premium as a counter-offer. At block 260, the user is enabled to reset or clear the interface of information. The user may then renegotiate the currency exchange rate and/or premium, or change the inputted information. At block 270, the user is enabled to accept the negotiated currency exchange rate and transaction premium. Accepting the negotiated currency exchange rate and transaction premium includes generating the contract with the negotiated currency exchange rate and transaction premium in accordance with the above inputted information.

Figure 3:
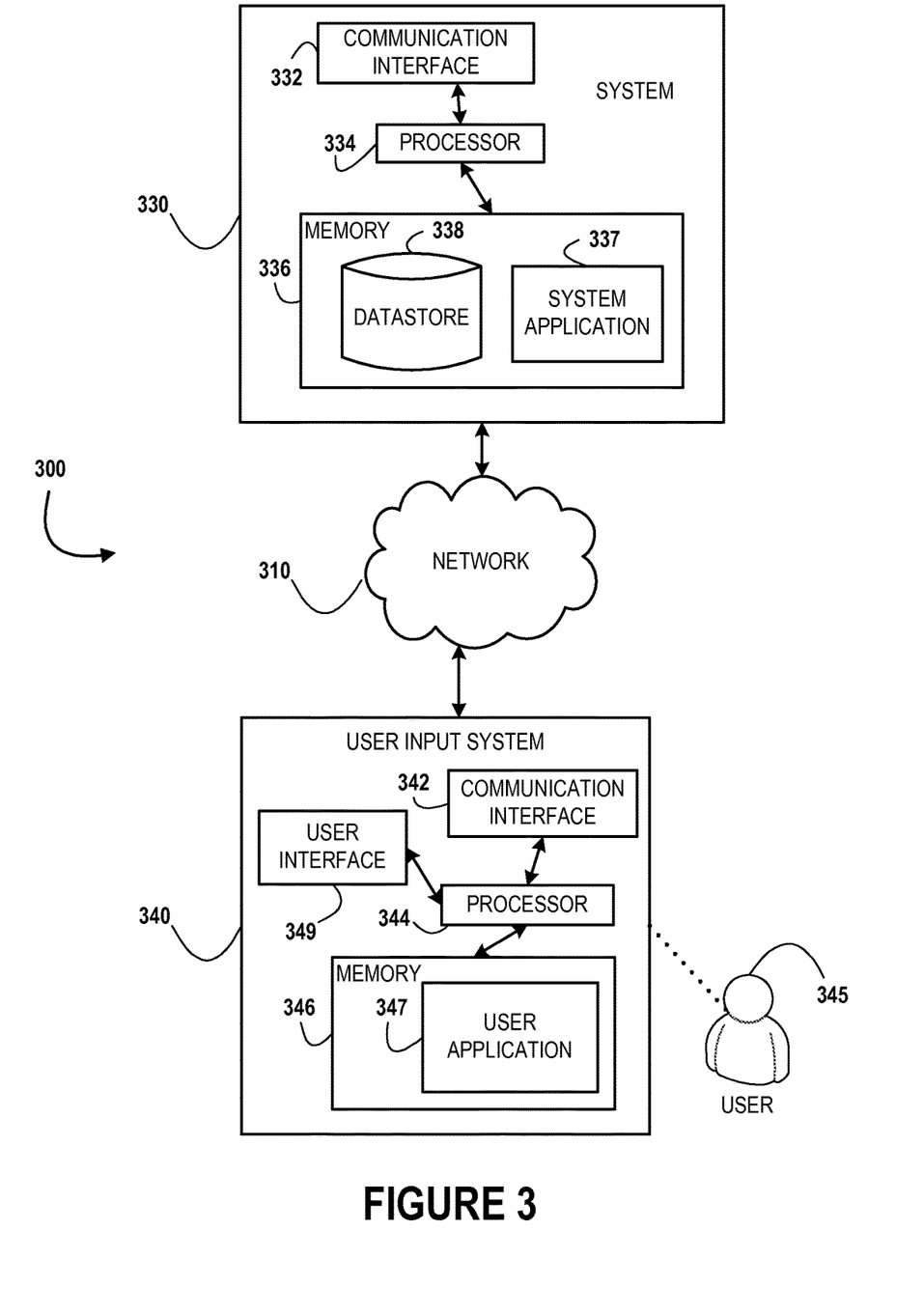
FIG. 3 is an exemplary system diagram of a system configured to execute embodiments of the present invention, in accordance with embodiments of the present invention.

FIG. 3 is an exemplary block diagram illustrating technical components of a system 300 for a adding a third party to a line of communication between a first user and a second user via a video conference system as described in the process flow described in FIG. 1 and the exemplary interface in FIG. 2. As illustrated, the system environment 300 includes a network 310, a system 330, and a user input system 340. Also shown in FIG. 3 is a user 345 of the user input system 340. The user input system 340 may be any computing device. The user 345 may be a person who uses the user input system 340 to execute a user application 347. The user application 347 may be an application to communicate with the system 330, perform a transaction, input information onto a user interface presented on the user input system 340, or the like. The user application 347 and/or the system application 337 may incorporate one or more parts of any process flow described herein.

As shown in FIG. 3, the system 330, and the user input system 340 are each operatively and selectively connected to the network 310, which may include one or more separate networks. In addition, the network 310 may include a telecommunication network, local area network (LAN), a wide area network (WAN), and/or a global area network (GAN), such as the Internet. It will also be understood that the network 310 is secure and may also include wireless and/or wireline and/or optical interconnection technology.

The user input system 340 may include any computerized apparatus that can be configured to perform any one or more of the functions of the user input system 340 described and/or contemplated herein. For example, the user 345 may use the user input system 340 to transmit and/or receive information or commands to and from the system 330. In some embodiments, for example, the user input system 340 may include a personal computer system (e.g. a non-mobile or non-portable computing system, or the like), a mobile computing device, a personal digital assistant, a mobile phone, a tablet computing device, a network device, a wearable computing device, a sensor, a point-of-sale (POS) device, an automated teller machine (ATM), and/or the like. As illustrated in FIG. 3, in accordance with some embodiments of the present invention, the user input system 340 includes a communication interface 342, a processor 344, a memory 346 having a user application 347 stored therein, and a user interface 349. In such embodiments, the communication interface 342 is operatively and selectively connected to the processor 344, which is operatively and selectively connected to the user interface 349 and the memory 346. In some embodiments, the user 345 may use the user application 347 to execute processes described with respect to the process flow and interfaces described herein. Specifically, the user application 347 executes the process flow described in FIG. 1.

Each communication interface described herein, including the communication interface 342, generally includes hardware, and, in some instances, software, that enables the user input system 340, to transport, send, receive, and/or otherwise communicate information to and/or from the communication interface of one or more other systems on the network 310. For example, the communication interface 342 of the user input system 340 may include a wireless transceiver, modem, server, electrical connection, and/or other electronic device that operatively connects the user input system 340 to another system such as the system 330. The wireless transceiver may include a radio circuit to enable wireless transmission and reception of information. Each processor described herein, including the processor 344, generally includes circuitry for implementing the audio, visual, and/or logic functions of the user input system 340. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 347 of the memory 346 of the user input system 340.

Each memory device described herein, including the memory 346 for storing the user application 347 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 3, the memory 346 includes the user application 347. In some embodiments, the user application 347 includes an interface for communicating with, navigating, controlling, configuring, and/or using the user input system 340. In some embodiments, the user application 347 includes computer-executable program code portions for instructing the processor 344 to perform one or more of the functions of the user application 347 described and/or contemplated herein. In some embodiments, the user application 347 may include and/or use one or more network and/or system communication protocols.

Also shown in FIG. 3 is the user interface 349. In some embodiments, the user interface 349 includes one or more output devices, such as a display and/or speaker, for presenting information to the user 345. In some embodiments, the user interface 349 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 345. In some embodiments, the user interface 349 includes the input and display devices of a mobile device, which are operable to receive and display information.

FIG. 3 also illustrates a system 330, in accordance with an embodiment of the present invention. The system 330 may refer to the "apparatus" described herein. The system 330 may include any computerized apparatus that can be configured to perform any one or more of the functions of the system 330 described and/or contemplated herein. In accordance with some embodiments, for example, the system 330 may include a computer network, an engine, a platform, a server, a database system, a front end system, a back end system, a personal computer system, and/or the like. Therefore, the system 330 may be a server managed by the entity. The system 330 may be located at the facility associated with the entity or remotely from the facility associated with the entity. In some embodiments, such as the one illustrated in FIG. 3, the system 330 includes a communication interface 332, a processor 334, and a memory 336, which includes a system application 337 and a datastore 338 stored therein. As shown, the communication interface 332 is operatively and selectively connected to the processor 334, which is operatively and selectively connected to the memory 336.

It will be understood that the system application 337 may be configured to implement any one or more portions of the various user interfaces and/or process flow described herein. The system application 337 may interact with the user application 347. It will also be understood that, in some embodiments, the memory includes other applications. It will also be understood that, in some embodiments, the system application 337 is configured to communicate with the datastore 338, the user input system 340, or the like.

It will be further understood that, in some embodiments, the system application 337 includes computer-executable program code portions for instructing the processor 334 to perform any one or more of the functions of the system application 337 described and/or contemplated herein. In some embodiments, the system application 337 may include and/or use one or more network and/or system communication protocols.

In addition to the system application 337, the memory 336 also includes the datastore 338. As used herein, the datastore 338 may be one or more distinct and/or remote datastores. In some embodiments, the datastore 338 is not located within the system and is instead located remotely from the system. In some embodiments, the datastore 338 stores information or data described herein.

It will be understood that the datastore 338 may include any one or more storage devices, including, but not limited to, datastores, databases, and/or any of the other storage devices typically associated with a computer system. It will also be understood that the datastore 338 may store information in any known way, such as, for example, by using one or more computer codes and/or languages, alphanumeric character strings, data sets, figures, tables, charts, links, documents, and/or the like. Further, in some embodiments, the datastore 338 may include information associated with one or more applications, such as, for example, the system application 337. It will also be understood that, in some embodiments, the datastore 338 provides a substantially real-time representation of the information stored therein, so that, for example, when the processor 334 accesses the datastore 338, the information stored therein is current or substantially current.

It will be understood that the embodiment of the system environment illustrated in FIG. 3 is exemplary and that other embodiments may vary. As another example, in some embodiments, the system 330 includes more, less, or different components. As another example, in some embodiments, some or all of the portions of the system environment 300 may be combined into a single portion. Likewise, in some embodiments, some or all of the portions of the system 330 may be separated into two or more distinct portions.

In addition, the various portions of the system environment 300 may be maintained for and/or by the same or separate parties. It will also be understood that the system 330 may include and/or implement any embodiment of the present invention described and/or contemplated herein. For example, in some embodiments, the system 330 is configured to implement any one or more of the embodiments of the process flows described and/or contemplated herein in connection any process flow described herein. Additionally, the system 330 or the user input system 340 is configured to initiate presentation of any of the user interfaces described herein.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for implementing a pre-contracted, staged, currency exchange system, the apparatus comprising:
   a memory;
   a processor; and
   a module stored in memory, executable by a processor, and configured to:
   electronically communicate with an application installed on a mobile device associated with a user;
   electronically receive, via a first interface associated with the application, travel information from the user, wherein the travel information comprises one or more predetermined geographic locations of the user and a preferred user language, wherein the travel information further comprises a predetermined amount of funds to be allocated for executing one or more transactions, wherein the allocated amount of funds remains in an existing account associated with the user, wherein the user is issued at least one of a card with predetermined period of validity, a personal identification number (PIN), a password, or a token associated with a wallet for accessing the allocated amount of funds during execution of the one or more transactions;
   process the travel information, wherein processing the travel information comprises determining a negotiated currency exchange rate based on the received travel information;
   generate a contract based on processing the travel information, wherein the contract comprises terms for executing one or more transactions using the negotiated currency exchange rate, wherein the negotiated currency exchange rate is valid for at least one of the predetermined geographic locations in the travel information, a predetermined number of transactions, or a predetermined period of time;
   electronically receive, via the application on the mobile device of the user, an indication that the user wishes to execute one or more transactions at an ATM associated with a first geographic location using the negotiated currency exchange rate, wherein the first geographic location is one of the predetermined geographic locations in the travel information;
   initiate the one or more transactions at the ATM, wherein initiating further comprises establishing a communication link between the mobile device of the user and the ATM;
   initiate a second user interface on the application on the mobile device associated with the user to facilitate the execution of the one or more transactions at the ATM;
   determine that a default display language associated with the ATM is different from the preferred user language in the travel information;

translate the information from the default display language of the ATM to the preferred language of the user;
transmit control signals configured to cause the second user interface to display information required to execute the one or more transactions in the preferred language of the user based on at least translating the information from the default display language of the ATM to the preferred language of the user;
receive, via the second user interface, a user input authorizing an execution of the one or more transactions; and
execute the one or more transactions using the negotiated currency exchange rate in accordance with the contract terms based on at least the user input authorizing the execution of the one or more transactions.

2. The apparatus of claim 1, wherein the travel information comprises at least one of a passenger name, an address, a phone number, a driver's license number, a birth certificate, a passport, an email address, an age, a date of birth, a flight number, a train number, a ship number, a reservation confirmation number, an arrival time, a departure time, a location, a zip code, a city, a country, global positioning system (GPS) coordinates, longitude and latitude, an IP address, a hotel name, a hotel address, an account number, a routing number, an account balance, a transaction history, a card number, a card expiration date, or account limits.

3. The apparatus of claim 1, wherein the user is a traveler on at least one of a vacation, a business trip, a school trip, a commute, an excursion, a safari, a tour, or a cruise.

4. The apparatus of claim 1, wherein the module is further configured to process the travel information, wherein processing the travel information further comprises determining a location associated with at least one of the user or a device associated with the user, wherein the device associated with the user is at least one of a smart phone, a tablet, a wearable device, a mobile phone, a laptop, or a computing device.

5. The apparatus of claim 1, wherein the module is further configured to process the travel information, wherein processing the travel information further comprises determining a negotiated transaction premium associated with executing the one or more transactions.

6. The apparatus of claim 1, wherein the module is further configured to enable the user to pre-stage execution of the one or more transactions.

7. The apparatus of claim 1, wherein the module is further configured to receive, from the user, one or more limits associated with executing the one or more transactions.

8. The apparatus of claim 1, wherein the allocated amount of funds is placed into an account with a predetermined period of validity, wherein the user is issued at least one of a card with predetermined period of validity, a personal identification number (PIN), a password, or a token associated with a mobile wallet for accessing the allocated amount of funds during execution of the one or more transactions.

9. The apparatus of claim 1, wherein the module is configured to present to the user at least one message, wherein the at least one message includes an offer to redetermine the determined negotiated currency exchange rate.

10. A method for implementing a pre-contracted, staged, currency exchange system the method comprising:
electronically communicating, using a computing device processor, with an application installed on a mobile device associated with a user;
electronically receiving via a first interface associated with the application, travel information from the user, wherein the travel information comprises one or more predetermined geographic locations of the user and a preferred user language, wherein the travel information further comprises a predetermined amount of funds to be allocated for executing one or more transactions, wherein the predetermined amount of funds remains in an existing account associated with the user, wherein the user is issued at least one of a card with predetermined period of validity, a personal identification number (PIN), a password, or a token associated with a wallet for accessing the allocated amount of funds during execution of the one or more transactions;
processing, using a computing device processor, the travel information, wherein processing the travel information comprises determining a negotiated currency exchange rate based on the received travel information;
generating, using a computing device processor, a contract based on processing the travel information, wherein the contract comprises terms for executing one or more transactions using the negotiated currency exchange rate, wherein the negotiated currency exchange rate is valid for at least one of the predetermined geographic locations in the travel information, a predetermined number of transactions, or a predetermined period of time;
electronically receiving, via the application on the mobile device of the user, an indication that the user wishes to execute one or more transactions at an ATM associated with a first geographic location using the negotiated currency exchange rate, wherein the first geographic location is one of the predetermined geographic locations in the travel information;
initiating, using a computing device processor, the one or more transactions at the ATM, wherein initiating further comprises establishing a communication link between the mobile device of the user and the ATM;
initiating, using a computing device processor, a second user interface on the application on the mobile device associated with the user to facilitate the execution of the one or more transactions at the ATM;
determining, using a computing device processor, that a default display language associated with the ATM is different from the preferred user language in the travel information;
translating, using a computing device processor, the information from the default display language of the ATM to the preferred language of the user;
transmitting, using a computing device processor, control signals configured to cause the second user interface to display information required to execute the one or more transactions in the preferred language of the user based on at least translating the information from the default display language of the ATM to the preferred language of the user;
receiving, via the second user interface, a user input authorizing an execution of the one or more transactions; and
executing, using a computing device processor, one or more transactions using the negotiated currency exchange rate in accordance with the contract terms based on at least the user input authorizing the execution of the one or more transactions.

11. The method of claim 10, wherein the allocated amount of funds is placed into an account with a predetermined period of validity, wherein the user is issued at least one of a card with predetermined period of validity, a personal identification number (PIN), a password, or a token associated with a mobile wallet for accessing the allocated amount of funds during execution of the one or more transactions.

12. A computer program product for implementing a pre-contracted, staged, currency exchange system, the computer program product comprising a non-transitory computer-readable medium comprising code causing an apparatus to:

electronically communicate with an application installed on a mobile device associated with a user;

electronically receive, via a first interface associated with the application, travel information from the user, wherein the travel information comprises one or more predetermined geographic locations of the user and a preferred user language, wherein the travel information further comprises a predetermined amount of funds to be allocated for executing one or more transactions, wherein the allocated amount of funds remains in an existing account associated with the user, wherein the user is issued at least one of a card with predetermined period of validity, a personal identification number (PIN), a password, or a token associated with a wallet for accessing the allocated amount of funds during execution of the one or more transactions;

process the travel information, wherein processing the travel information comprises determining a negotiated currency exchange rate based on the received travel information;

generate a contract based on processing the travel information, wherein the contract comprises terms for executing one or more transactions using the negotiated currency exchange rate, wherein the negotiated currency exchange rate is valid for at least one of the predetermined geographic locations in the travel information, a predetermined number of transactions, or a predetermined period of time;

electronically receive, via the application on the mobile device of the user, an indication that the user wishes to execute one or more transactions at an ATM associated with a first geographic location using the negotiated currency exchange rate, wherein the first geographic location is one of the predetermined geographic locations in the travel information;

initiate the one or more transactions at the ATM, wherein initiating further comprises establishing a communication link between the mobile device of the user and the ATM;

initiate a second user interface on the application on the mobile device associated with the user to facilitate the execution of the one or more transactions at the ATM;

determine that a default display language associated with the ATM is different from the preferred user language in the travel information;

translate the information from the default display language of the ATM to the preferred language of the user;

transmit control signals configured to cause the second user interface to display information required to execute the one or more transactions in the preferred language of the user based on at least translating the information from the default display language of the ATM to the preferred language of the user;

receive, via the second user interface, a user input authorizing an execution of the one or more transactions; and execute the one or more transactions using the negotiated currency exchange rate in accordance with the contract terms based on at least the user input authorizing the execution of the one or more transactions.

13. The computer program product of claim 12, wherein the allocated amount of funds is placed into an account with a predetermined period of validity, wherein the user is issued at least one of a card with predetermined period of validity, a personal identification number (PIN), a password, or a token associated with a mobile wallet for accessing the allocated amount of funds during execution of the one or more transactions.

14. The apparatus of claim 7, wherein the one or more limits further comprises at least spending limits, transaction account limits, transaction location limits, purchase type limits, and purchase category limits.

15. The apparatus of claim 1, wherein the module is further configured to execute the one or more transactions using the predetermined amount of funds until the predetermined amount of funds in the existing account of the user are exhausted.

16. The method of claim 10, wherein the one or more limits further comprises at least spending limits, transaction account limits, transaction location limits, purchase type limits, and purchase category limits.

17. The method of claim 10, wherein the method further comprises receiving, from the user, one or more limits associated with executing the one or more transactions.

18. The method of claim 17, wherein the one or more limits further comprises at least spending limits, transaction account limits, transaction location limits, purchase type limits, and purchase category limits.

19. The method of claim 10, wherein the method further comprises executing the one or more transactions using the predetermined amount of funds until the predetermined amount of funds in the existing account of the user are exhausted.

20. The computer program product of claim 12, wherein the one or more limits further comprises at least spending limits, transaction account limits, transaction location limits, purchase type limits, and purchase category limits.

* * * * *